United States Patent
Kim et al.

(10) Patent No.: US 11,723,397 B2
(45) Date of Patent: Aug. 15, 2023

(54) CIGARETTE SMOKE GENERATING AND SAMPLING DEVICES, SYSTEMS, AND ITS OPERATING METHOD FOR PREPARATION OF WHOLE CIGARETTE SMOKE CONDENSATE (WCSC)

(71) Applicant: Korea Research Institute of Chemical Technology, Daejeon (KR)

(72) Inventors: Yong-Hyun Kim, Jeollabuk-do (KR); Sung-Hwan Kim, Busan (KR); Min-Seok Kim, Jeollabuk-do (KR)

(73) Assignee: KOREA RESEARCH INSTITUTE OF CHEMICAL TECHNOLOGY, Daejeon (KR)

( * ) Notice: Subject to any disclaimer, the term of this patent is extended or adjusted under 35 U.S.C. 154(b) by 17 days.

(21) Appl. No.: 17/338,206

(22) Filed: Jun. 3, 2021

(65) Prior Publication Data
US 2021/0378286 A1    Dec. 9, 2021

(30) Foreign Application Priority Data

Jun. 9, 2020 (KR) .......................... 10-2020-0069695

(51) Int. Cl.
| | | |
|---|---|---|
| *A24C 5/34* | (2006.01) | |
| *G01N 1/22* | (2006.01) | |
| *G01N 1/24* | (2006.01) | |

(52) U.S. Cl.
CPC ............. *A24C 5/3406* (2013.01); *G01N 1/22* (2013.01); *G01N 1/2205* (2013.01);
(Continued)

(58) Field of Classification Search
CPC .. A24C 5/3406; G01N 1/2205; G01N 1/2258; G01N 1/22; G01N 1/24; G01N 2001/2282; G01N 2001/2261
(Continued)

(56) References Cited

U.S. PATENT DOCUMENTS 3,732,874 A * 5/1973 Wagner ................ A24C 5/3406
                                                         73/23.31
4,140,003 A * 2/1979 Pillsbury, Jr. ........ A24C 5/3406
                                                         73/23.31
(Continued)

FOREIGN PATENT DOCUMENTS

| CN | 203732519 U | * | 7/2014 |
|---|---|---|---|
| CN | 203732519 U | | 7/2014 |

(Continued)

OTHER PUBLICATIONS

Korean Intellectual Property Office (KIPO), Written Opinion, dated 2020, 5 pgs (Year: 2020).*

(Continued)

*Primary Examiner* — Clayton E. LaBalle
*Assistant Examiner* — Kevin C Butler
(74) *Attorney, Agent, or Firm* — Cantor Colburn LLP

(57) ABSTRACT

The techniques disclosed in the present specification relate to devices, systems, and methods using the same that generate cigarette smoke and then separate and collect substances of the cigarette smoke generated into particulate and gaseous substances for the preparation of a whole cigarette smoke condensate, which may comprise: a cigarette mount on which one or more cigarettes are mounted; an automatic ignition device for igniting the one or more cigarettes; a cigarette smoke collection unit for collecting substances of cigarette smoke generated from the ignited one or more cigarettes; one or more cigarette smoke intake lines configured to suck the cigarette smoke; one or more cigarette smoke exhaust lines configured to discharge the cigarette smoke; and one or more collection unit connecting lines connected to the cigarette smoke collection unit.

19 Claims, 4 Drawing Sheets

(52) U.S. Cl.
CPC ............. *G01N 1/2258* (2013.01); *G01N 1/24* (2013.01); *G01N 2001/2261* (2013.01); *G01N 2001/2282* (2013.01)

(58) Field of Classification Search
USPC ...................................................... 73/863.11
See application file for complete search history.

(56) References Cited

U.S. PATENT DOCUMENTS

| | | | | | |
|---|---|---|---|---|---|
| 4,589,775 | A | * | 5/1986 | Milhous, Jr. ......... | G01N 1/2247 356/439 |
| 2016/0113321 | A1 | * | 4/2016 | Verbeeck ................ | A24F 40/80 73/23.31 |
| 2021/0378286 | A1 | * | 12/2021 | Kim ..................... | G01N 1/2214 |

FOREIGN PATENT DOCUMENTS

| | | | | | |
|---|---|---|---|---|---|
| CN | 105510522 | A | * | 4/2016 | |
| CN | 106092633 | A | | 11/2016 | |
| CN | 209296624 | U | | 8/2019 | |
| JP | 59126226 | A | * | 7/1984 | ............... G01N 1/00 |
| JP | 2002171954 | A | | 6/2002 | |
| JP | 2005164388 | A | | 6/2005 | |
| KR | 19990072034 | A | * | 9/1999 | ............... A24C 5/34 |
| KR | 100288713 | B1 | | 2/2001 | |
| KR | 1020140110113 | | | 9/2014 | |

OTHER PUBLICATIONS

Korean Intellectual Property Office (KIPO), Request for the submission of an Opinion, Jun. 9, 2020, 6 pgs (Year: 2020).*
2:'Standardized methods for the regulation of cigarette-smoke constituents', the C. Wright, the Trends in Analytical Chemistry 66 (2015), aod the pp. 118-127(Mar. 31, 2015) (Year: 2015).*
Arvinte, Adina et al., "The NADH Electrochemical Detection Performed at Carbon Nanofibers Modified Glassy Carbon Electrode" Electroanalysis, vol. 19, Issue 14, Jul. 2007 pp. 1455-1459.
Mutyala, Sankararao, et al., "A highly sensitive NADH biosensor using nitrogen doped graphene modified electrodes" Journal of Electroanalytical Chemistry, vol. 775 (2016) pp. 329-336.
Shi, Jin, et al. (2011). Surface Modification Approaches for Electrochemical Biosensors, Biosensors—Emerging Materials and Applications, Prof. Pier Andrea Serra (Ed.), ISBN: 978-953-307-328-6, InTech, Available from: http://www.intechopen.com/books/biosensors-emerging-materials-andapplications/surface-modification-approaches-for-electrochemical-biosensors.
Wright, Chris "Standardized methods for the regulation of cigarette-smoke constituents" TrAC Trends in Analytical Chemistry, vol. 66, pp. 118-127.

* cited by examiner

Section A-A

CIGARETTE SMOKE GENERATING AND SAMPLING DEVICES, SYSTEMS, AND ITS OPERATING METHOD FOR PREPARATION OF WHOLE CIGARETTE SMOKE CONDENSATE (WCSC)

CROSS REFERENCE TO RELATED APPLICATION

This application claims the benefit of Korean Patent Application No. 10-2020-0069695, filed on Jun. 9, 2020, which is incorporated by reference in its entirety herein.

FIELD OF THE DISCLOSURE

The techniques disclosed in the present specification relate to cigarette smoke generating and collecting devices, systems, and methods for the preparation of a whole cigarette smoke condensate, and more particularly, to devices, systems, and methods thereof for collecting substances of cigarette smoke generated by a cigarette smoke generator by separating them into gaseous substances and particulate substances.

BACKGROUND

The harmfulness assessment of cigarette smoke is mainly performed in the manner of having laboratory animals inhale and exposed to the mainstream smoke of cigarette smoke and checking the effects on them. However, such a method as described above requires enormous physical resources such as operating personnel. Accordingly, there has been a need for a simpler method of assessing the harmfulness of cigarette smoke in order to resolve such a problem, and thus, a method of assessing the harmfulness by turning cigarette smoke into an extract is being utilized. In addition, it is necessary to generate cigarette smoke in order to perform the analysis on the substances of cigarette smoke in the method as described above. There exist a number of methods for generating cigarette smoke, but guidelines for ISO standard cigarette smoke generation methods are known and these are also commonly used.

Although there existed conventionally such devices as for generating cigarette smoke, a device that efficiently generates cigarette smoke has not been developed as a cigarette smoke generating device in compliance with the ISO standard cigarette smoke generation methods mentioned above, and it was just a level of automating cigarette smoke generating devices and systems.

In particular, despite the need for detailed analysis on the constituents of cigarette smoke in order to conduct studies on the harmfulness of cigarette smoke, the reality is that there are no devices, systems, and methods thereof for collecting cigarette smoke generated from the cigarette smoke generating device described above and for capturing it by separating it into gaseous substances and particulate substances.

SUMMARY OF THE INVENTION

Technical Objects

It is an object of the present invention to solve the problems described above and other problems associated therewith.

It is an example object of the present specification to provide cigarette smoke generating devices based on the ISO standard cigarette smoke generation methods, and devices, systems, and methods thereof for separating into and collecting gaseous substances and particulate substances of cigarette smoke generated therefrom.

The technical objects to be achieved by the cigarette smoke generating and collecting devices, systems, and methods for the preparation of a cigarette smoke condensate in accordance with the spirit of the techniques disclosed in the present specification are not limited to the objects for solving the problems mentioned above, and other objects that have not been mentioned will be clearly understood by those of ordinary skill in the art from the following description.

Technical Solution

A cigarette smoke generating and collecting device for preparation of a cigarette smoke condensate in accordance with an embodiment of the techniques disclosed in the present specification may comprise: a cigarette mount on which one or more cigarettes are mounted; an automatic ignition device for igniting the one or more cigarettes; a cigarette smoke collection unit for collecting substances of cigarette smoke generated from the ignited one or more cigarettes; one or more cigarette smoke intake lines configured to suck the cigarette smoke; one or more cigarette smoke exhaust lines configured to discharge the cigarette smoke; and one or more collection unit connecting lines connected to the cigarette smoke collection unit.

The cigarette mount may be such that a set of one or more cigarettes are arranged in one or more rows.

The cigarette smoke generating and collecting device may further comprise: a tightening part consisting of an elastic body surrounding each of the one or more cigarettes on the cigarette mount; a tightening nut surrounding the tightening part; and a connecting part connected to a cigarette smoke intake port at a front portion of each of the one or more cigarettes.

The cigarette smoke generating and collecting device may further comprise: one or more solenoid valves arranged between each of the one or more cigarettes and a cigarette smoke intake unit and configured to block or pass the cigarette smoke.

The cigarette smoke generating and collecting device may comprise: one or more pumps connected to the one or more cigarette smoke intake lines and cigarette smoke exhaust lines to alternately operate intake and exhaust of the cigarette smoke.

The cigarette smoke collection unit may comprise a filter module configured to collect substances of the cigarette smoke.

The filter module may comprise: one or more cigarette smoke inlets connected to the one or more cigarette smoke collection units; one or more Cambridge filters connected to the one or more cigarette smoke inlets; and an impinger containing a liquid phase substance.

The cigarette smoke generating and collecting device may be such that the one or more Cambridge filters collect particulate substances, and the impinger collects gaseous substances.

The cigarette smoke generating and collecting device may further comprise: a filter mount configured to mount at once the filter module to the cigarette smoke collection unit; and one or more latches for attaching/detaching to/from a cigarette mainstream smoke extractor case on a rear side of the cigarette smoke collection unit.

In addition, the automatic ignition device may be a heating wire coil.

The cigarette smoke generating and collecting device may further comprise:

a cleaning module connected to a cigarette smoke intake unit and comprising a valve for cleaning the cigarette smoke intake unit, the cigarette smoke intake lines, and the cigarette smoke exhaust lines.

The cigarette smoke generating and collecting device may further comprise a cigarette removal module for pushing and removing at once the one or more cigarettes.

The cigarette smoke generating and collecting device may further comprise an outer case of a cigarette smoke generator, wherein the outer case may comprise: an operating status check window capable of checking an operating status of the cigarette smoke generator; and a cleaner ventilation opening connected to a cleaning module.

The cigarette smoke generating and collecting device may further comprise: a rotating unit for adjusting an angle of a cigarette smoke generator; and a height adjustment unit for adjusting a height of the cigarette smoke generator.

The cigarette smoke generating and collecting device may be such that the rotating unit and the height adjustment unit are automatically controllable using a motor.

A cigarette smoke generating and collecting system in accordance with an embodiment of the techniques disclosed in the present specification may comprise: a cigarette smoke generator; and a cigarette smoke collection unit, wherein the cigarette smoke generator may comprise: one or more solenoid valves for sequentially passing and blocking cigarette smoke from one or more cigarettes arranged in one row; one or more cigarette smoke intake lines for sucking the cigarette smoke; one or more cigarette smoke exhaust lines for discharging the cigarette smoke to a collection unit connecting line; and one or more pumps connected to the one or more cigarette smoke intake lines and cigarette smoke exhaust lines to alternately operate intake and exhaust of the cigarette smoke, and wherein the cigarette smoke collection unit may comprise: one or more Cambridge filters for collecting particulate substances; and an impinger for collecting gaseous substances, and the cigarette smoke generating and collecting system may further comprise a control unit for controlling operation of the cigarette smoke generator and the cigarette smoke collection unit.

The cigarette smoke generating and collecting system may be such that the one or more pumps are in pairs, and each of the pumps of the pairs of pumps alternately performs intake or exhaust to thereby simultaneously operate the intake and exhaust.

A cigarette smoke generating and collecting method in accordance with an embodiment of the techniques disclosed in the present specification may comprise: arranging one or more cigarettes in a line in each row; igniting the one or more cigarettes by moving an automatic ignition device up and down or left and right; sucking cigarette smoke from the one or more cigarettes independently and sequentially for each row using a solenoid valve; sucking the cigarette smoke using one of a pair of pumps; simultaneously with the step of sucking, discharging the cigarette smoke using a pump different from the pump; and separating and collecting the discharged cigarette smoke into particulate substances and gaseous substances, using one or more Cambridge filters and an impinger included in a cigarette smoke collection unit, wherein the steps of sucking and discharging the cigarette smoke may be repeated.

The cigarette smoke generating and collecting method may further comprise: pushing and removing at once the one or more cigarettes for which the cigarette smoke has been collected; and cleaning a cigarette smoke intake port, a cigarette smoke intake unit, cigarette smoke intake lines, and cigarette smoke exhaust lines through outside air.

The cigarette smoke generating and collecting method may further comprise: adjusting an angle through rotation of a cigarette smoke generator; and adjusting a height of the cigarette smoke generator.

A computer program stored on a medium in accordance with an embodiment of the techniques disclosed in the present specification may comprise computer-readable instructions configured to perform the steps of the cigarette smoke generating and collecting method.

Effects of the Invention

The cigarette smoke generating and collecting devices, systems, and methods using the same in accordance with an embodiment of the techniques disclosed in the present specification have the following effects.

By providing standardized cigarette smoke generating and collecting devices in line with the ISO guidelines, it is possible to lay the foundation for the standardization of a system for assessing the harmfulness of cigarette smoke.

Furthermore, it is possible to quickly and efficiently generate cigarette smoke by providing an automated cigarette smoke generating system without consuming physical resources. In addition, by separating the sucked cigarette smoke into gaseous substances and particulate substances and collecting them, it is possible to conduct studies on the harmful substances in cigarette smoke more precisely.

In addition, a convenient operating environment can be provided to a user by using a control unit and a computer program for controlling the operation of the cigarette smoke generating and collecting device.

Nonetheless, the effects in accordance with one embodiment of the techniques disclosed in the present specification are not limited to those mentioned above, and other effects that have not been mentioned will be clearly understood by those of ordinary skill in the art from the following description.

BRIEF DESCRIPTION OF THE DRAWINGS

A brief description of each drawing is provided to better understand the drawings cited herein.

DETAILED DESCRIPTION OF THE PREFERRED EMBODIMENTS

Figure 1:
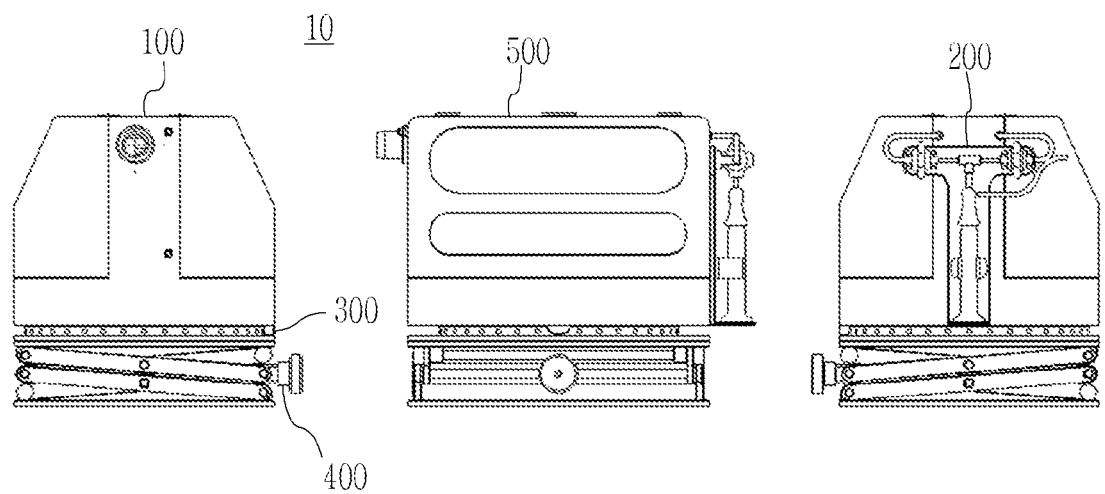
FIG. 1 is views showing both sides and the front of a cigarette smoke generating and collecting device in accordance with one embodiment of the techniques disclosed in the present specification.

As the techniques disclosed in the present specification may be changed in various ways and may have several embodiments, particular embodiments will be illustrated in the drawings and will be described in detail through the detailed description thereof. However, this is not intended to limit the techniques disclosed in the present specification to particular embodiments,
and it is to be understood that the techniques disclosed in the present specification include all changes, equivalents, and substitutes that fall within the spirit and scope of the techniques disclosed in the present specification.

In describing the techniques disclosed in the present specification, if it is determined that a specific description of related known techniques may unnecessarily obscure the subject matter of the techniques disclosed in the present specification, a detailed description thereof will be omitted. In addition, the numbers (e.g., first, second, etc.) used in the description of the present specification are merely identification symbols for distinguishing one component from another.

Furthermore, if one component is described as being "connected" or "coupled", or the like, with another component in the present specification, the one component may be directly connected or coupled with said another component; however, it should be understood that it may also be connected or coupled via a further component in the middle, unless otherwise described.

Moreover, for a constituent element represented by "~unit" in the present specification, two or more components may be combined into one component, or one component may be divided into two or more by more subdivided functions. Further, each of the components to be described below may additionally perform some or all of the functions that other components are responsible for, in addition to the main functions that it is responsible for, and as a matter of course, some of the main functions that each component is responsible for may be assigned to and performed by other components.

Such expressions as "first," "second," "$1^{st}$," "$2^{nd}$," or the like used in various embodiments may modify various components regardless of the order and/or importance thereof, and do not limit the corresponding components. For example, a first component may be named as a second component, and similarly, a second component may also be renamed to a first component, without departing from the scope of the techniques disclosed in the present specification.

Hereinafter, a cigarette smoke generating and collecting device, a system, and a method associated therewith in accordance with a preferred embodiment will be described in detail.

FIG. 1 is views showing both sides and the front of a cigarette mainstream smoke extractor 10 in accordance with an embodiment of the present invention.

According to FIG. 1, an outer case 500 is mounted on the outer side of a cigarette smoke generator 100, and referring to the left side-view, lines of the cigarette smoke generator 100 and vent holes for the ventilation of the inner space are located. Further, referring to the right side-view, it can be seen that a cigarette smoke collection unit 200 is mounted and connected to the outer case 500 of the cigarette smoke generator 100. In addition, it is shown that the bottom of the cigarette smoke generator 100 further includes a rotating unit 300 capable of rotating it and a height adjustment unit 400 capable of adjusting the height thereof. As will be described in more detail below, a cigarette smoke generating and collecting system including the components according to FIG. 1 may further include a control unit for controlling the components of the cigarette smoke generating and collecting device described above, and may flexibly control them according to the needs of users.

Figure 2:
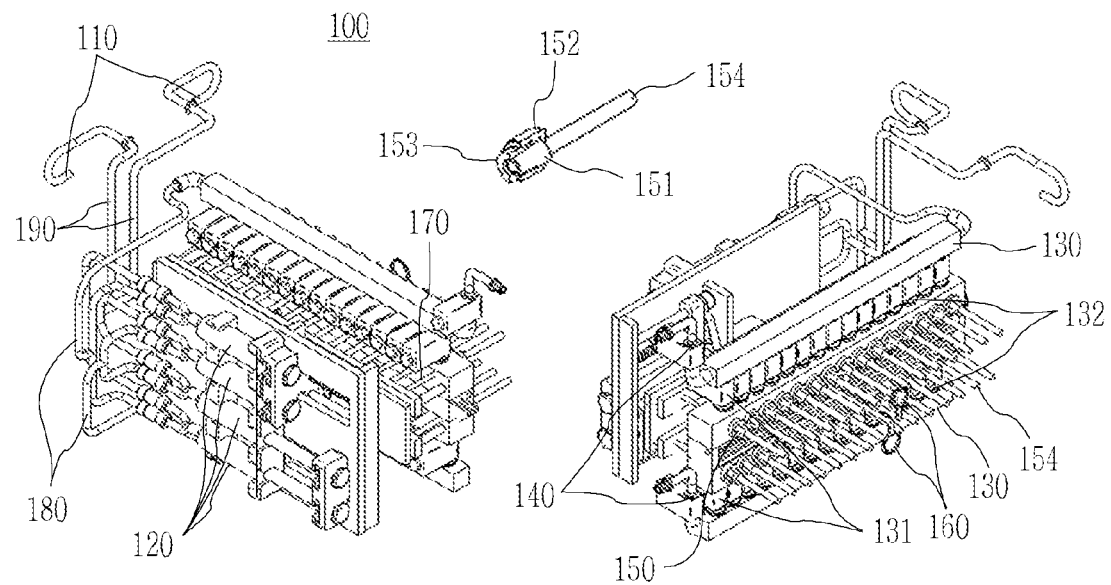
FIG. 2 is a perspective view showing a detailed structure of a cigarette smoke generator disclosed in the present specification.

FIG. 2 is a view showing a detailed configuration of a cigarette smoke generator 100 in accordance with an embodiment of the present invention.

In the following, the configuration of the cigarette smoke generator 100 in accordance with an embodiment of the present invention and a method of generating cigarette smoke implemented by organically operating the configuration will be described in detail.

According to FIG. 2, it can be seen that one or more cigarettes 154 are arranged in 2 rows and 15 columns based on the standard cigarette smoke generation guidelines presented by ISO. The arrangement of the cigarettes 154 may be modified, and the arrangement in FIG. 2 is merely exemplary. A cigarette mounting module 150 with which the cigarettes 154 are mounted on the device includes a tightening part 151 for preventing perforation of the cigarette filter and a tightening nut 152 surrounding the tightening part 151, and the tightening part 151 may be made of an elastic body such as Teflon or rubber. In addition, it can be seen that the cigarette mounting module 150 further includes a connecting part 153 connected to a cigarette smoke intake port 132 on the front side of the cigarette 154.

When the cigarettes 154 are mounted in the above structure, the cigarettes 154 are sequentially ignited for each row by an automatic ignition device 160 arranged at the front of the cigarette smoke generator 100. The automatic ignition device 160 may be a heating wire coil. When cigarette smoke is generated from the ignited cigarettes 154, the cigarette smoke flows into the cigarette smoke intake port 132. A solenoid valve 131 is located between the cigarette smoke intake port 132 and a cigarette smoke intake unit 130, and the solenoid valve 131 performs an operation of blocking or opening the cigarette smoke between the cigarette smoke intake port 132 and the cigarette smoke intake unit 130. It can be seen that the cigarette smoke intake unit 130, the solenoid valve 131, and the cigarette smoke intake port 132 are arranged in one line at the top and bottom, respectively, in order to suck, for each row, the smoke from the one or more cigarettes 154 consisting of two rows. Each of the solenoid valves 131 at the top/bottom arranged in each column is controlled to sequentially suck the cigarette smoke generated from the cigarettes 154 in each column from the left. For example, the solenoid valves 131 at the respective top/bottom of the first column based on the left are opened and their cigarette smoke is sucked, while the solenoid valves 131 in other columns are blocked. Thereafter, the solenoid valves 131 in the second column are opened in the same manner, and all solenoid valves 131 except for these are blocked. The control method as described above may be operated so that each row can suck cigarette smoke sequentially at the same time, but each row may also be operated alternately in time. However, the solenoid valves 131 of a number of columns included in one row are not opened at the same time, and they operate sequentially.

Subsequently, the cigarette smoke sucked into the cigarette smoke intake unit 130 is sucked by a pump 120 along a cigarette smoke intake line 180. As an example shown in FIG. 2, the cigarette smoke generated from the cigarettes 154 in the first row is sucked by the first and fourth pumps 120 from above through the cigarette smoke intake unit 130 at the top, and the cigarette smoke generated from the cigarettes 154 in the second row is sucked by the second and third pumps 120 from above through the cigarette smoke intake unit 130 at the bottom. However, such an order is for illustrative purposes only, and the arrangement and order of the pumps 120 that sucks cigarette smoke generated by the cigarettes 154 in each row may be changed.

After the cigarette smoke is sucked by the pumps 120, the corresponding cigarette smoke is exhausted along the cigarette smoke exhaust line 190 again by the pumps 120. This cigarette smoke is moved to a cigarette smoke collection unit 200 along a collection unit connecting line 110 by the power of the pumps 120. The operation example described above has been described for only one column of the one or more cigarettes 154, and the operations described above are sequentially repeated from the left to quickly and efficiently generate and exhaust cigarette smoke without idle time.

Figure 3:
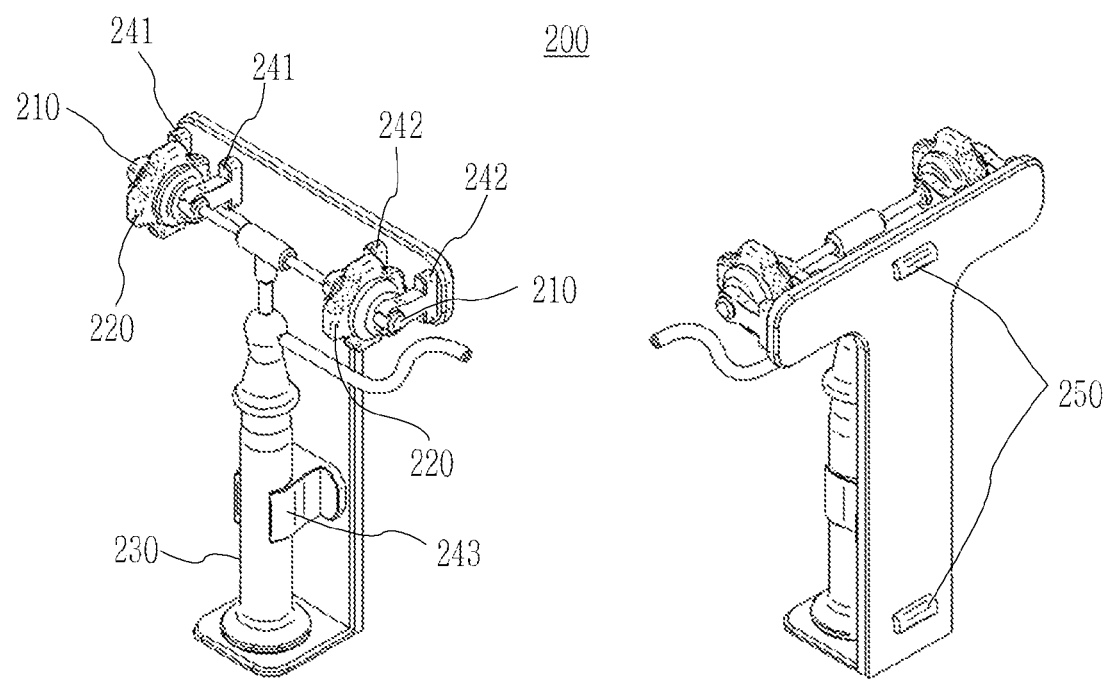
FIG. 3 is a perspective view of the front or rear of a cigarette smoke collection unit disclosed in the present specification.

FIG. 3 shows views depicting, respectively, the front/rear of a cigarette smoke collection unit 200 in accordance with an embodiment of the present invention.

According to FIG. 3, the cigarette smoke sucked along the collection unit connecting line 110 is sucked into a Cambridge filter 220 through a cigarette smoke inlet 210. The cigarette smoke inlet 210 and the Cambridge filter 220 are configured on both sides of the top of a filter module, respectively, and these are also configured to suck the cigarette smoke of each of the cigarette smoke intake units 130 at the top/bottom, respectively. The Cambridge filter 220 may be configured to collect particulate substances in the cigarette smoke. After the particulate substances in the cigarette smoke are collected, this cigarette smoke moves downward and flows into an impinger 230 filled with a liquid phase substance such as PBS. The impinger 230 may be configured to collect gaseous substances in the cigarette smoke. Therefore, for the cigarette smoke of each row of the one or more cigarettes 143, particulate substances are collected, respectively, by the Cambridge filters 220 on the left and right sides, and gaseous substances are collected at once by the impinger 230.

Furthermore, filter mounts 241, 242, and 243 may be additionally provided so that the filter module can be stably and conveniently coupled to the cigarette smoke collection unit 200. In addition, attachable/detachable latches 250 may be provided so that the cigarette smoke collection unit 200 can be stably coupled to one side of the outer case 500 of the cigarette smoke generator 100.

Through the configuration as described above, the present invention has a useful effect of being able to provide a device and a system for generating cigarette smoke and separating and collecting substances in the cigarette smoke, and a method associated therewith as well, by making up for the problems of existing devices that provide cigarette smoke generation only.

Figure 4:
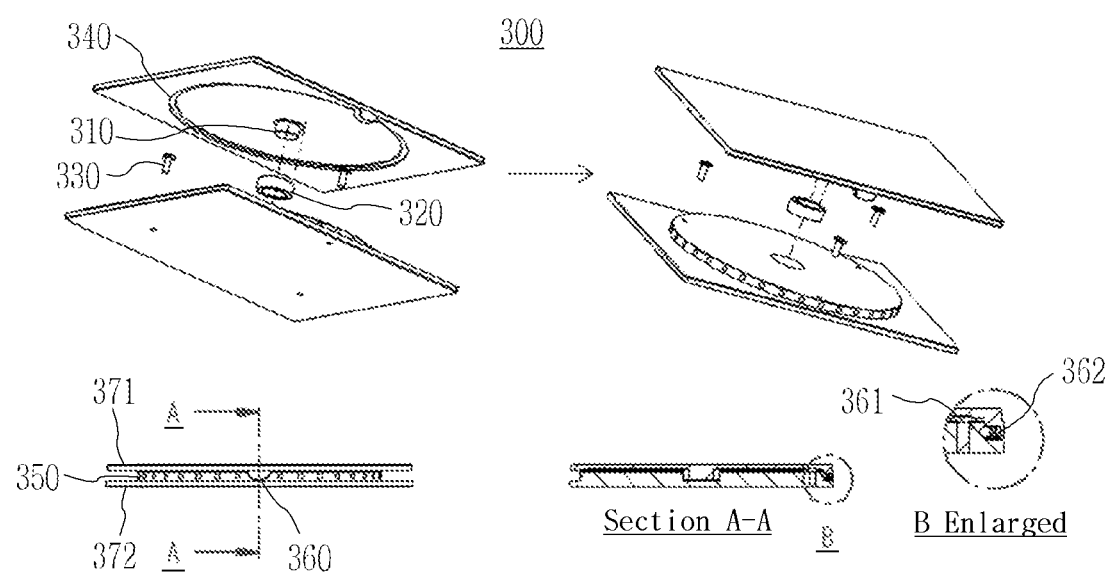
FIG. 4 is a view showing in detail a rotating unit of the cigarette smoke generator disclosed in the present specification.

FIG. 4 is a view showing in detail a rotating unit 300 of a cigarette smoke generator 100 in accordance with an embodiment of the present invention.

The rotating unit 300 is arranged at the bottom of the cigarette smoke generator 100, and includes a rotating shaft 310, a rotating shaft bearing 320, an external bearing 330, and an external bearing support 340, as shown in FIG. 4. The configuration as described above is provided for the rotational operation of the cigarette smoke generator 100. A fixed plate 372 is held to be fixed at the bottom, and a rotating plate 371 is configured to be rotated according to a rotation angle predetermined by a positioning ball groove 350 and a positioning pin module 360. The positioning pin module 360 consists of a positioning pin 361 and a spring 362, and the positioning pin module 360 may be coupled to the positioning ball groove 350 according to a predetermined angle, to thereby maintain a rotation angle.

Figure 5:
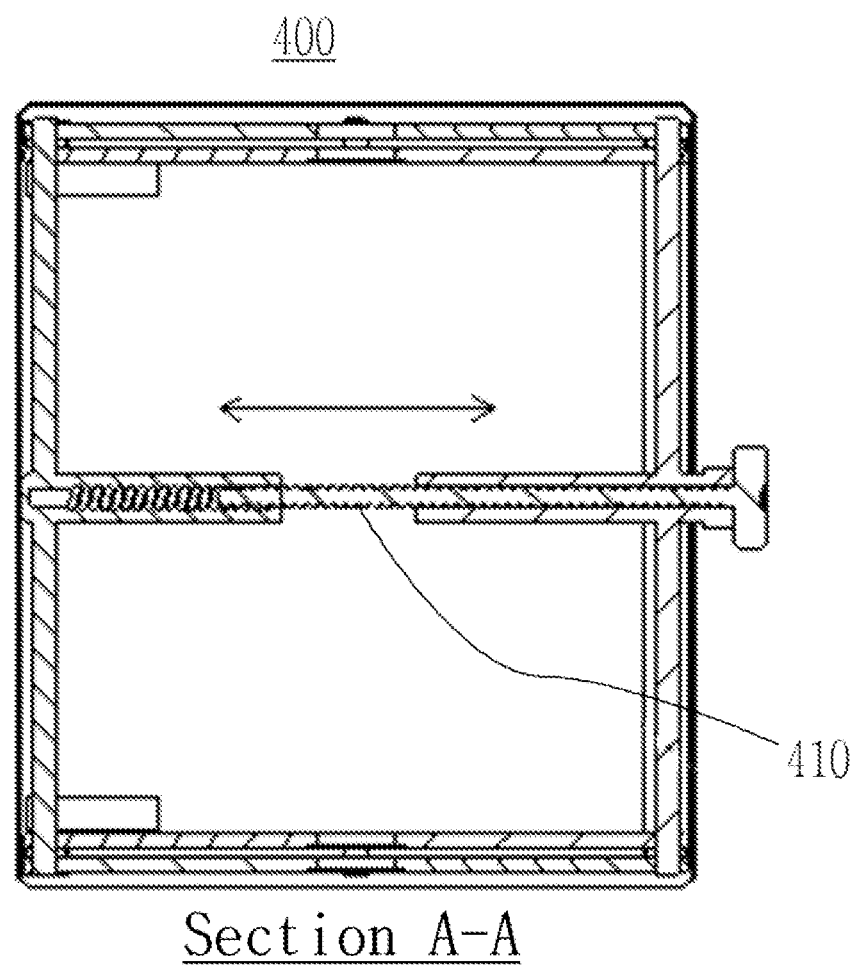
FIG. 5 is a view showing in detail a height adjustment unit of the cigarette smoke generator disclosed in the present specification.
Figure 5:
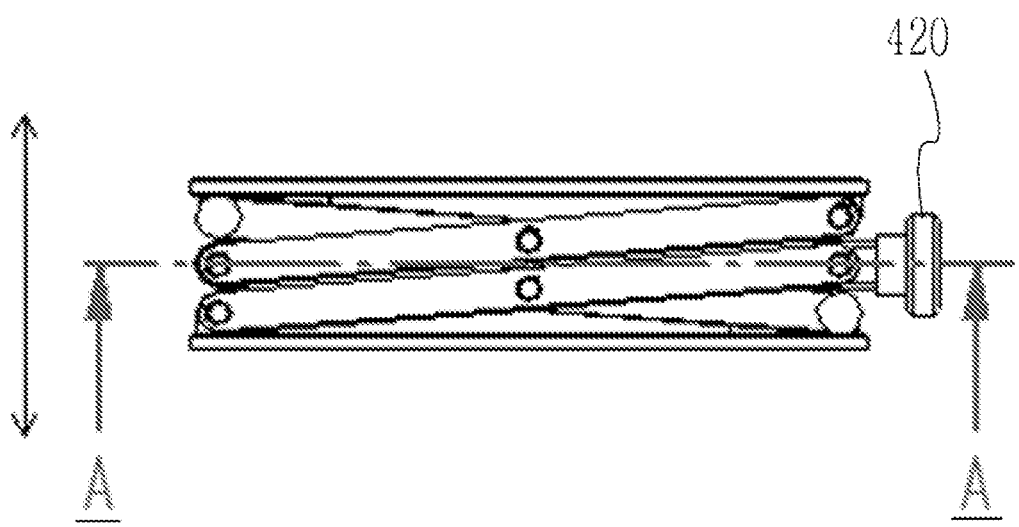

FIG. 5 is a view showing in detail a height adjustment unit 400 in accordance with an embodiment of the present invention.

According to FIG. 5, the height adjustment unit 400 includes a screw 410 and a height adjustment handle 420. By operating the height adjustment handle 410, the user can adjust the height of the cigarette smoke generator 100. The screw 410 is configured to be movable left and right, and is used to adjust the height of the cigarette smoke generator 100.

The rotating unit 300 and the height adjustment unit 400 of FIGS. 4 and 5 may be operated manually, but may also be controlled automatically by attaching a motor.

Figure 6:
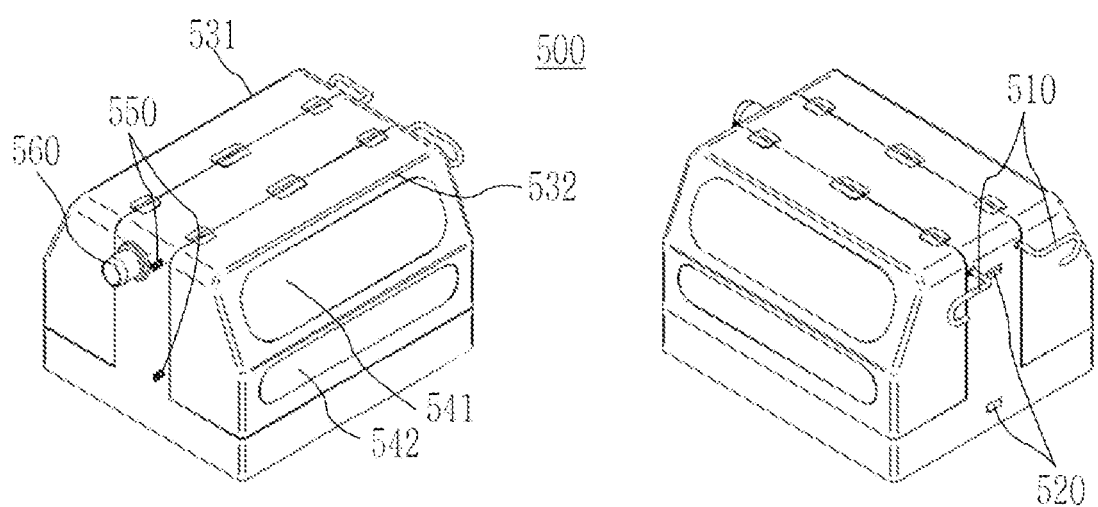
FIG. 6 shows a perspective view of an outer case of the cigarette smoke generator disclosed in the present specification.

FIG. 6 shows in detail an outer case 500 of a cigarette smoke generator 100 in accordance with an embodiment of the present invention.

FIG. 6 depicts a collection unit connecting line 510 extending from the inside on one side, and further depicts a collection unit mount 520 to which the cigarette smoke collection unit 200 may be mounted. In addition, doors 531 and 532 for opening and closing the cigarette smoke generator 100 are provided, and operating status check windows 541 and 542 are provided so as to check the operating status of the cigarette smoke generator 100.

Furthermore, an intake/exhaust line ventilation opening 550 configured to clean a cigarette smoke intake/exhaust line and connected to the intake/exhaust line is included, and a ventilation opening 560 for cleaning other gases inside the outer case 500 may be further included.

To specifically describe the cleaning operation, returning to FIG. 2 again, it can be seen that cleaning valves 140 arranged in a direction extending along the cigarette smoke intake unit 130 are shown. The cleaning valves 140 may be controlled by turning on/off a cleaning function. If the cleaning function is activated, the cleaning valves 140 are opened and at the same time, all of the solenoid valves 131 are closed. Thereafter, the pumps 120 are used to suck in the outside air, so that the outside air is introduced into a line extending from the cleaning valves 140 to the pumps 120. When the outside air is introduced, the pumps 120 are used again to exhaust the cigarette smoke present in the lines, thereby cleaning the lines. The cigarette smoke exhausted is discharged to the outside through the intake/exhaust line ventilation opening 550 disposed in the outer case 500.

In addition, referring back to FIG. 2, a cigarette removal module 170 is shown for conveniently removing at once cigarettes that have completed both the generation and collection operation of cigarette smoke. The cigarette removal module 170 may provide a user with a convenient usage environment by pushing and removing all cigarettes in one direction at once.

The cigarette smoke generating and collecting device described above may further include a control unit for controlling it, and the control unit may further include a controller for controlling these operations in detail. The controller may control each operation of the cigarette smoke generator 100 and a detailed operation of the collection unit 200 according to a user's request, and is also able to control the cleaning operation and the operation of the cigarette removal module 170 that are additionally provided. The controller may control the rotating unit 300 and the height adjustment unit 400 located at the bottom of the cigarette smoke generator 100, to adjust the rotation angle and the adjustment unit of the cigarette smoke generator 100 according to a user's request. The control unit and the controller may be located inside or outside the cigarette mainstream smoke extractor 10, and can transmit/receive control signals by communicating wirelessly or by wire with the cigarette mainstream smoke extractor 10.

Moreover, in order to effectively control the systems and methods described above, a computer program including instructions related to the control of the systems and methods may be further included. The computer program is stored in a data storage medium, and instructions for executing the systems and methods described above are read through a computer processor according to a value inputted by a user or a set environment.

The devices described above and control therefor may be implemented in hardware components, software components, and/or combinations of hardware components and software components. For example, the devices and components described in the embodiments may be implemented using one or more general-purpose computers or special-purpose computers, such as a processor, a controller, an arithmetic logic unit (ALU), a digital signal processor, a microcomputer, a field programmable gate array (FPGA), a programmable logic unit (PLU), a microprocessor, or any other device that can execute and respond to instructions. A processing device can execute an operating system (OS) and one or more software applications running on the operating system. Further, the processing device may access, store, operate, process, and generate data in response to the execution of software. Although there are cases that have been described in which one processing device is used for the convenience of understanding, it will be appreciated by those of ordinary skill in the art that the processing device may include a plurality of processing elements and/or a plurality of types of processing elements. For example, the processing device may include a plurality of processors or one processor and one controller. Moreover, other processing configurations, such as a parallel processor, are also possible.

The software may include computer programs, codes, instructions, or combinations of one or more of these, and the processing device may be configured to operate as desired, or the processing device may be instructed independently or in combination. The software and/or data may be embodied permanently or temporarily in any type of machine, component, physical device, virtual device, computer storage medium or device, so as to be interpreted by the processing device or to provide instructions or data to the processing device. The software may also be distributed over networked computer systems and stored or executed in a distributed manner. The software and data may be stored on one or more computer-readable recording media.

The methods in accordance with the embodiments may be implemented in the form of program instructions that can be executed via various computer means and recorded in a computer-readable medium. The computer-readable medium may include program instructions, data files, data structures, and the like alone or in combination. The program instructions recorded on the medium may be those specially designed and configured for the embodiments, or those known to and usable by those of ordinary skill in the art of computer software. Examples of the computer-readable recording media include magnetic media such as hard disks, floppy disks, and magnetic tapes, optical media such as CD-ROMs and DVDs, magneto-optical media such as floptical disks, and hardware devices specially configured to store and execute program instructions, such as ROM, RAM, flash memory, etc. Examples of the program instructions include not only machine language codes such as those produced by a compiler, but also high-level language codes that can be executed by a computer using an interpreter or the like. The hardware devices described above may be configured to operate as one or more software modules to perform the operations of the embodiments, and vice versa.

As set forth above, although the embodiments have been described with limited embodiments and drawings, those of ordinary skill in the art can make various modifications and variations from the above description. For example, appropriate results can be achieved even if the techniques described are performed in a different order than the methods described, and/or the components of the systems, structures, devices, circuits, etc., described above are coupled or combined in a form different from the methods described, or replaced or substituted by other components or equivalents.

Thus, other implementations, other embodiments, and those equivalent to the claims also fall within the scope of the claims to be described later.

What is claimed is:

1. A cigarette smoke generating and collecting device for preparation of a cigarette smoke condensate, comprising:
   a cigarette mount on which one or more cigarettes are mounted;
   an automatic ignition device for igniting the one or more cigarettes;
   a cigarette smoke collection unit for collecting substances of cigarette smoke generated from the ignited one or more cigarettes;
   one or more cigarette smoke intake lines configured to suck the cigarette smoke;
   one or more cigarette smoke exhaust lines configured to discharge the cigarette smoke;
   one or more pumps connected to the one or more cigarette smoke intake lines and the one or more cigarette smoke exhaust lines, the one or more pumps configured to alternately operate intake and exhaust of the cigarette smoke; and
   one or more collection unit connecting lines connected to the cigarette smoke collection unit.

2. The cigarette smoke generating and collecting device of claim 1, wherein the cigarette mount is such that a set of one or more cigarettes are arranged in one or more rows.

3. The cigarette smoke generating and collecting device of claim 2, further comprising:
   a tightening part consisting of an elastic body surrounding each of the one or more cigarettes on the cigarette mount;
   a tightening nut surrounding the tightening part; and
   a connecting part connected to a cigarette smoke intake port at a front portion of each of the one or more cigarettes.

4. The cigarette smoke generating and collecting device of claim 2, further comprising:
   one or more solenoid valves arranged between each of the one or more cigarettes and a cigarette smoke intake unit and configured to block or pass the cigarette smoke.

5. The cigarette smoke generating and collecting device of claim 1, wherein the cigarette smoke collection unit comprises a filter module configured to collect substances of the cigarette smoke.

6. The cigarette smoke generating and collecting device of claim 5, wherein the filter module comprises:
   one or more cigarette smoke inlets connected to the one or more cigarette smoke collection units;

one or more Cambridge filters connected to the one or more cigarette smoke inlets; and an impinger containing a liquid phase substance.

7. The cigarette smoke generating and collecting device of claim 6, wherein the one or more Cambridge filters collect particulate substances, and the impinger collects gaseous substances.

8. The cigarette smoke generating and collecting device of claim 5, further comprising:
   a filter mount configured to mount at once the filter module to the cigarette smoke collection unit; and
   one or more latches for attaching/detaching to/from a cigarette mainstream smoke extractor case on a rear side of the cigarette smoke collection unit.

9. The cigarette smoke generating and collecting device of claim 1, further comprising:
   a cleaning module connected to a cigarette smoke intake unit, and comprising a valve for cleaning the cigarette smoke intake unit, the cigarette smoke intake lines, and the cigarette smoke exhaust lines.

10. The cigarette smoke generating and collecting device of claim 1, further comprising:
    a cigarette removal module for pushing and removing at once the one or more cigarettes.

11. The cigarette smoke generating and collecting device of claim 1, further comprising:
    an outer case of a cigarette smoke generator,
    wherein the outer case comprises:
    an operating status check window capable of checking an operating status of the cigarette smoke generator; and
    a cleaner ventilation opening connected to a cleaning module.

12. The cigarette smoke generating and collecting device of claim 1, further comprising:
    a rotating unit for adjusting an angle of a cigarette smoke generator; and
    a height adjustment unit for adjusting a height of the cigarette smoke generator.

13. The cigarette smoke generating and collecting device of claim 12, wherein the rotating unit and the height adjustment unit are automatically controllable using a motor.

14. A cigarette smoke generating and collecting system, comprising:
    a cigarette smoke generator; and
    a cigarette smoke collection unit,
    wherein the cigarette smoke generator comprises:
    one or more solenoid valves for sequentially passing and blocking cigarette smoke from one or more cigarettes arranged in one row;
    one or more cigarette smoke intake lines for sucking the cigarette smoke;
    one or more cigarette smoke exhaust lines for discharging the cigarette smoke to a collection unit connecting line; and
    one or more pumps connected to the one or more cigarette smoke intake lines and the one or more cigarette smoke exhaust lines, the one or more pumps configured to alternately operate intake and exhaust of the cigarette smoke, and
    wherein the cigarette smoke collection unit comprises:
    one or more Cambridge filters for collecting particulate substances; and
    an impinger for collecting gaseous substances, and
    the cigarette smoke generating and collecting system, further comprising:
    a control unit for controlling operation of the cigarette smoke generator and the cigarette smoke collection unit.

15. The cigarette smoke generating and collecting system of claim 14, wherein the one or more pumps are in pairs, and each of the pumps of the pairs of pumps alternately performs intake or exhaust to thereby simultaneously operate the intake and exhaust.

16. A cigarette smoke generating and collecting method, comprising:
    arranging one or more cigarettes in a line in each row;
    igniting the one or more cigarettes by moving an automatic ignition device up and down or left and right;
    sucking cigarette smoke from the one or more cigarettes independently and sequentially for each row using a solenoid valve;
    sucking the cigarette smoke using a first pump one of a pair of pumps, wherein the pair of pumps is configured to alternately operate intake and exhaust of the cigarette smoke;
    simultaneously with the step of sucking, discharging the cigarette smoke using a second pump of the pair of pumps; and
    separating and collecting the discharged cigarette smoke into particulate substances and gaseous substances, using one or more Cambridge filters and an impinger included in a cigarette smoke collection unit,
    wherein the steps of sucking and discharging the cigarette smoke are repeated.

17. The cigarette smoke generating and collecting method of claim 16, further comprising:
    pushing and removing at once the one or more cigarettes for which the cigarette smoke has been collected; and
    cleaning a cigarette smoke intake port, a cigarette smoke intake unit, cigarette smoke intake lines, and cigarette smoke exhaust lines through outside air.

18. The cigarette smoke generating and collecting method of claim 16, further comprising:
    adjusting an angle through rotation of a cigarette smoke generator; and
    adjusting a height of the cigarette smoke generator.

19. A computer program stored on a medium comprising computer-readable instructions configured to perform the steps of claim 16.

* * * * *